US011465753B2

(12) United States Patent
Lokanatha et al.

(10) Patent No.: US 11,465,753 B2
(45) Date of Patent: Oct. 11, 2022

(54) STOWABLE CABIN ATTENDANT SEAT WITH VERTICALLY TRANSLATING BACKREST

(71) Applicant: Goodrich Aerospace Services Private Limited, Bengaluru (IN)

(72) Inventors: Naveen Badala Lokanatha, Bangalore (IN); Mahesh Hosmani, Bangalore (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 164 days.

(21) Appl. No.: 16/794,840

(22) Filed: Feb. 19, 2020

(65) Prior Publication Data
US 2021/0253257 A1 Aug. 19, 2021

(51) Int. Cl.
*B64D 11/06* (2006.01)

(52) U.S. Cl.
CPC ........ *B64D 11/0691* (2014.12); *B64D 11/062* (2014.12); *B64D 11/0698* (2014.12)

(58) Field of Classification Search
CPC . B64D 11/0691; B64D 11/069; B64D 11/062; B60N 2/242; B60N 2/3027; B60N 2/3063; A47C 9/06
See application file for complete search history.

(56) References Cited

U.S. PATENT DOCUMENTS

| | | | |
|---|---|---|---|
| 1,412,367 A | 4/1922 | Noack | |
| 3,594,037 A * | 7/1971 | Sherman | A47C 7/56 297/14 |
| 4,832,404 A | 5/1989 | Baymak et al. | |
| 9,260,190 B2 | 2/2016 | Ehlers et al. | |
| 9,327,836 B2 | 5/2016 | Weitzel et al. | |
| 9,540,108 B2 | 1/2017 | Ehlers et al. | |
| 9,650,146 B2 | 5/2017 | Boenning et al. | |
| 9,682,780 B2 | 6/2017 | Boenning et al. | |
| 9,856,024 B2 | 1/2018 | Burd | |
| 10,040,557 B2 | 8/2018 | Breuer et al. | |
| 10,293,944 B2 | 5/2019 | Spagl | |
| 10,414,503 B2 | 9/2019 | Spagl | |

(Continued)

FOREIGN PATENT DOCUMENTS

| | | | |
|---|---|---|---|
| FR | 2120503 | * | 8/1972 |
| FR | 2962714 | * | 1/2012 |

(Continued)

OTHER PUBLICATIONS

English Translation of FR_2962714_A1_I.*
Extended Search Report for European Application No. 21158138.4 dated Jun. 24, 2021, 7 pages.

*Primary Examiner* — Philip J Bonzell
*Assistant Examiner* — Ashesh Dangol
(74) *Attorney, Agent, or Firm* — Suiter Swantz pc llo

(57) ABSTRACT

A stowable cabin attendant seat assembly includes a frame assembly mountable within a wall recess, a backrest mounted for reciprocating vertical translation within the frame assembly, a seat pan mounted for pivoting motion relative to the frame assembly, and at least one link connecting the seat pan to the backrest. The at least one link coordinates the seat pan and backrest motions such that upward lifting motion on the seat pan pushes the backrest vertically up for compact stowing and downward pivoting motion on the seat pan pulls the backrest vertically down.

18 Claims, 5 Drawing Sheets

(56) References Cited

U.S. PATENT DOCUMENTS

| | | | |
|---|---|---|---|
| 10,470,578 B2 * | 11/2019 | Ehlinger | A47C 4/04 |
| 10,543,922 B2 | 1/2020 | Gonnsen | |
| 2018/0155035 A1 * | 6/2018 | Spagl | B64D 11/064 |
| 2020/0139860 A1 * | 5/2020 | Sakurai | B60N 2/3047 |

FOREIGN PATENT DOCUMENTS

| | | |
|---|---|---|
| FR | 2962714 A1 | 1/2012 |
| GB | 2563051 A | 12/2018 |

* cited by examiner

STOWABLE CABIN ATTENDANT SEAT WITH VERTICALLY TRANSLATING BACKREST

BACKGROUND

Aircraft and other vehicle passenger cabins typically include seats grouped by seating class and galleys and lavatories positioned between seating classes and at the front and rear of the cabin near pathways to emergency exits. Walls of galleys and lavatories, based on their proximity to emergency exits, serve as ideal mounting locations for cabin attendant seats to position the flight crew near the exit doors.

While passenger seats remain deployed, cabin attendant seats can deploy as needed such as for use during for taxi, take-off and landing (TTOL), turbulence, emergency events. Between uses, cabin attendant seats can stow to maximize exit pathway space to better aid the movement of the flight crew, passengers and equipment.

Conventional cabin attendant seats mount to walls and include a fixed backrest and folding seat pan. In the stowed position of the seat, the seat pan stacks up against the face of the fixed backrest thereby limiting the minimum possible thickness of the folded seat to a value not less than the sum of the individual thicknesses of the backrest and seat pan. This minimum achievable thickness causes the folded seat to extend outwardly from the wall consequently limiting the ability to maximize exit pathway space.

Thus, there exists a need for a more compact stowing cabin attendant seat to maximize cabin interior space.

SUMMARY OF THE INVENTIVE ASPECTS

To achieve the foregoing and other advantages, in one embodiment the present invention provides a cabin attendant seat assembly including a frame assembly with spaced frame members disposed in a vertical plane, a backrest mounted for reciprocating vertical translation between the spaced frame members, a seat pan mounted for pivoting motion relative to the frame assembly, and at least one link coordinating the reciprocating vertical translation of the backrest with the pivoting motion of the seat pan such that upward pivoting motion of the seat pan causes the backrest to raise and downward pivoting motion of the seat pan causes the backrest to lower.

In some embodiments, the seat pan and the backrest move together between a stowed position of the seat in which the backrest and the seat pan are longitudinally aligned in the vertical plane with the backrest positioned above the seat pan, and a deployed position of the seat in which the seat pan is at an angle to the backrest, for example, perpendicular to the backrest.

In some embodiments, the spaced frame members include guide tracks and the backrest may carry guides, wherein the guides are engaged to travel along guide tracks to guide the reciprocating vertical translation of the backrest.

In some embodiments, the guide tracks are slide channels and the guides are slides engaged to slide along the slide channels.

In some embodiments, the guide tracks are roller tracks and the guides are rollers engaged to roll along the roller tracks.

In some embodiments, the guide tracks have an upper end and a lower end, wherein the lower end determines a lowest vertical position of the backrest relative to the spaced frame members and a corresponding angle of the seat pan.

In some embodiments, the assembly further includes a hinge coupling the seat pan to the frame assembly providing at least 90 degrees rotation of the seat pan relative to the frame assembly.

In some embodiments, the assembly includes first and second links symmetrically arranged on opposing sides of the seat pan and the backrest, wherein ends of the first and second links are coupled to the respective seat pan and backrest through revolute joints.

In some embodiments, the spaced frame members are oriented vertically and are adapted to mount within a wall recess.

In some embodiments, the assembly further includes a headrest coupled to a top of the backrest.

In some embodiments, the thickness of the cabin attendant seat assembly, when in the stowed position, is no greater than a thickness of a thicker of the backrest and the seat pan.

In some embodiments, the assembly further includes a retainer adapted to engage one of the seat pan and the backrest in the stowed position.

In some embodiments, the assembly further includes a passenger restraint device anchored to the frame assembly for restraining a seated passenger against at least one of the seat pan and the backrest.

In another embodiment the present invention provides a wall assembly adapted to be installed in an aircraft cabin including a recess formed in a wall and a cabin attendant seat assembly mounted in the recess. The wall may be part of a lavatory, galley, partition or monument. The cabin attendant seat assembly includes a frame assembly including spaced frame members disposed in a vertical plane, a backrest mounted for reciprocating vertical translation between the spaced frame members, a seat pan mounted for pivoting motion relative to the frame assembly, and at least one link coordinating the reciprocating vertical translation of the backrest with the pivoting motion of the seat pan such that upward pivoting motion of the seat pan causes the backrest to raise and downward pivoting motion of the seat pan causes the backrest to lower.

In some embodiments, the seat pan and the backrest move together between a stowed position of the seat in which the backrest and the seat pan longitudinally align in the vertical plane with the backrest positioned above the seat pan, and a deployed position in which the seat pan is at an angle to the backrest.

In some embodiments, the cabin attendant seat assembly further includes a headrest coupled to a top of the backrest, a retainer for engaging at least one of the seat pan and the backrest to maintain the backrest and the seat pan in the stowed position, and a passenger restraint device anchored to the frame assembly for restraining a seated passenger against at least one of the seat pan and the backrest.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTION

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

Figure 1:
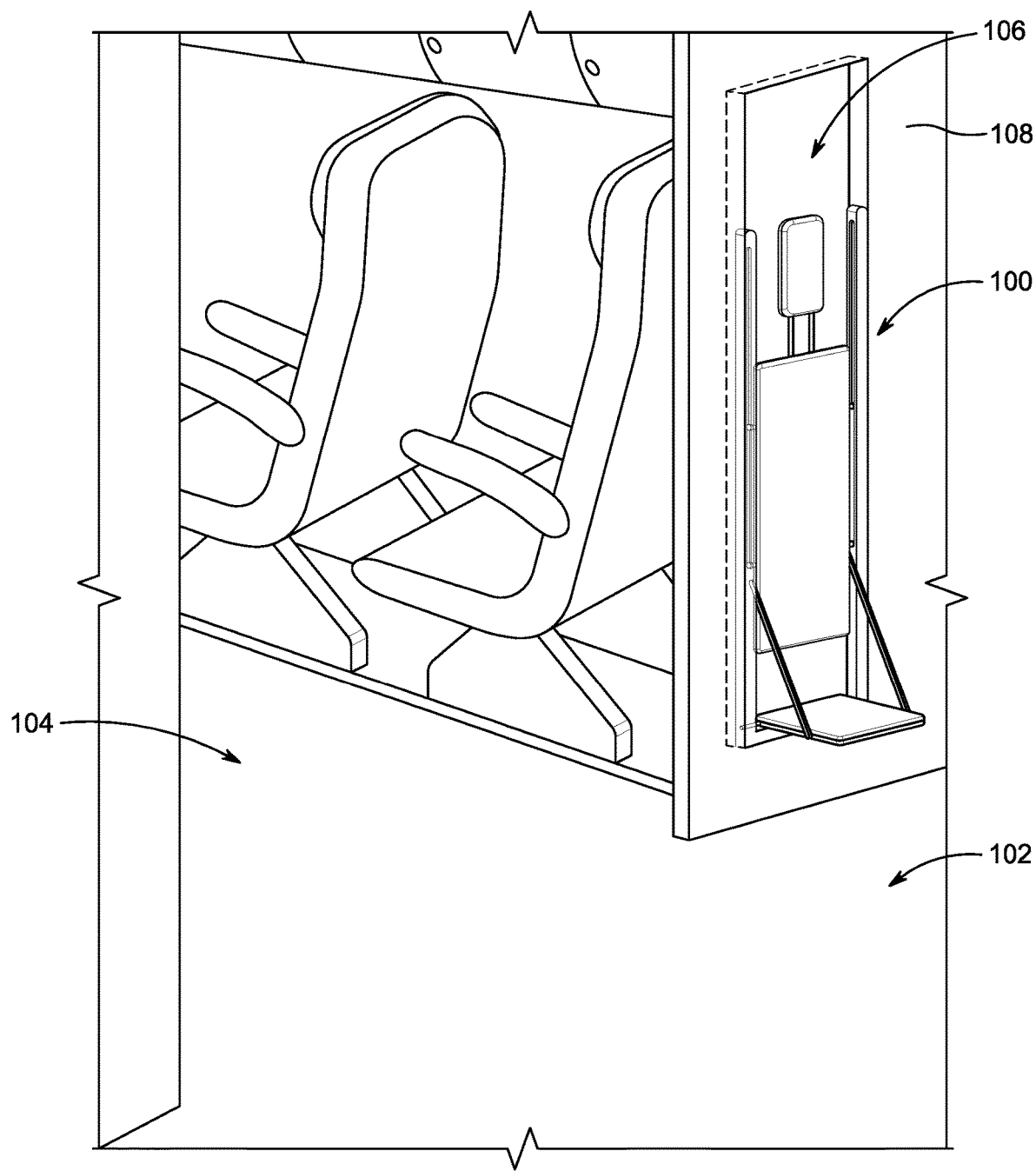
FIG. 1 is a fragmentary perspective view of a vehicle cabin including a cabin attendant seat according to an exemplary embodiment.

FIG. 1 shows a cabin attendant seat (CAS) assembly 100, or "CAS," installed in a vehicle cabin environment such as an aircraft cabin. The CAS 100 is shown in a deployed position ready for use by a crew member. In some implementations, the CAS 100 may be positioned in an exit pathway 102 through which passengers and crew embark and disembark the aircraft through an exit door. The exit pathway 102 may be perpendicular to a longitudinal aisle 104 parallel to the aircraft longitudinal axis. The CAS 100 may mount within a recess 106 formed in a wall 108 such that the CAS, when in the stowed position, rests flush with the face of the wall so as not to extend into the exit pathway 102. The wall 108 may be part of a dedicated cabin attendant seat assembly, or may be part of any of a galley, lavatory, partition, door, bulkhead, monument, etc. In some implementations, the wall 108 includes internal support members for mounting the CAS 100 to the wall while supporting the weight of the CAS and seat occupant.

The CAS 100 is provided for use in an aircraft cabin where crew seating is wanted at certain times, for example, during taxi, take-off and landing (TTOL) and turbulent conditions, and clear space in the aircraft cabin is preferred at other times, for example, during flight. The CAS 100 accordingly can be stowed in the recess 106 between uses and deploys outside of the recess, at least part of the CAS, as needed. As discussed further below, the CAS 100 generally includes a frame assembly mountable, at least part of the frame assembly, in the recess 106, a backrest mounted for vertical translation relative to the frame assembly, a seat pan mounted for pivoting motion relative to the frame assembly, and a link connecting the seat pan to the backrest to coordinate the seat pan and backrest motions. The connection of the seat pan to the backrest allows seat pan motion to drive backrest motion, or vice versa. For example, when the seat pan is lifted up by the seat occupant for stowing, the link connecting the seat pan to the backrest pushes the backrest vertically up into a resting position above the fully closed seat pan, and when the seat pan is lowered by the seat occupant for use, the link pulls the backrest vertically down into a use position. Link length and attachment positions to the respective backrest and seat pan can be customized to control the amount of vertical translation of the backrest and seat pan angle in the deployed position. Longitudinal stacking of the backrest and the seat pan in the stowed position provides a thin vertical profile that allows the CAS 100 to be mounted, for example, in a shallow wall recess.

Figure 2:
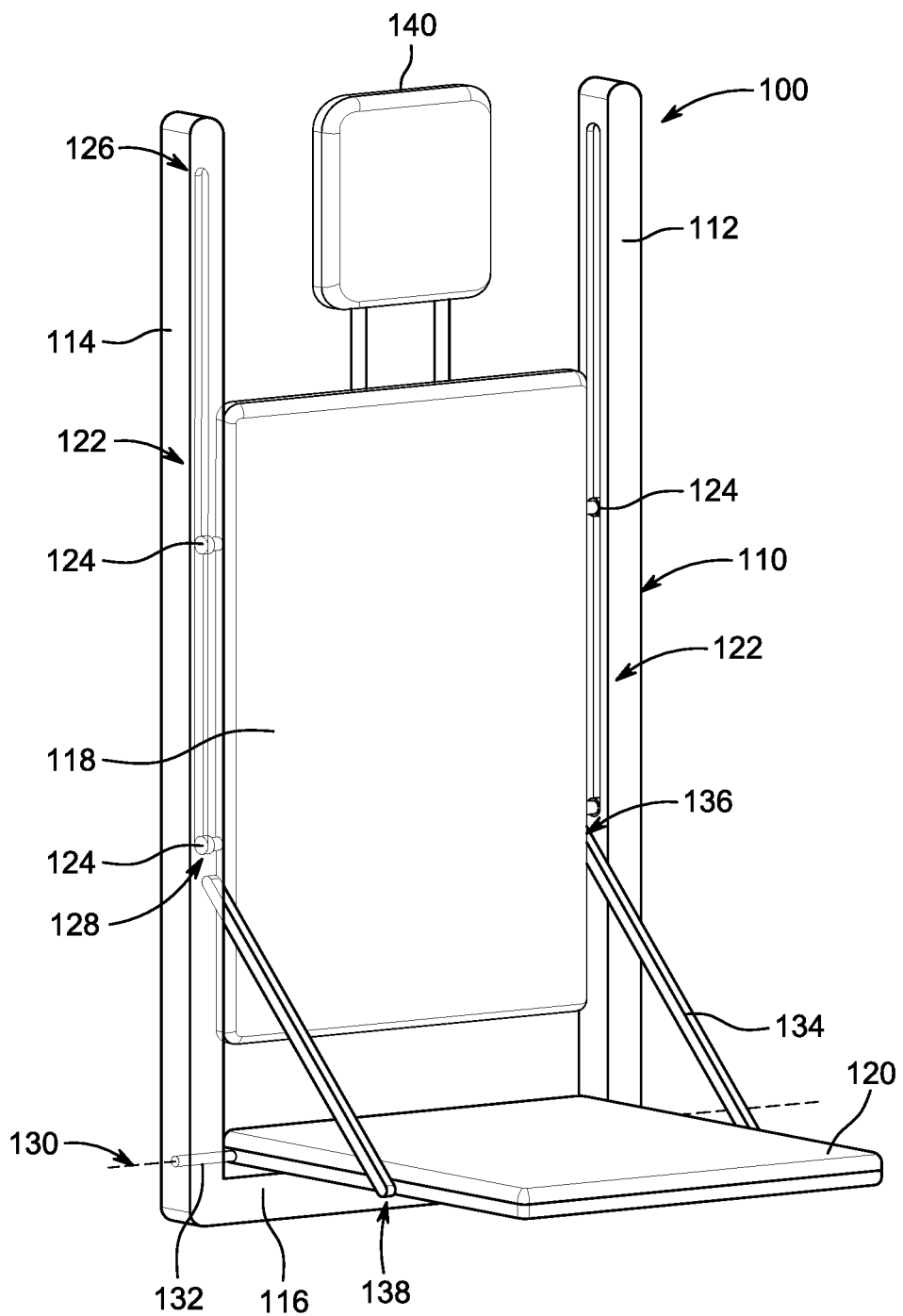
FIG. 2 is a perspective view of a cabin attendant seat according to an exemplary embodiment shown in a deployed position.

FIG. 2 shows the CAS 100 removed from the wall and in the fully deployed position ready for seating. The frame assembly 110 is adapted to mount to a wall, for example, against a face of the wall or within a recess formed in the wall. In some implementations, the frame assembly 110 includes elongate, spaced-apart vertical frame members 112, 114 and an elongate lower horizontal frame member 116. The vertical frame member 112, 114 and horizontal frame member 116 together form a U-shaped frame assembly having an open top end. The frame members 112, 114, 116 align in a vertical plane. The spaced frame members 112, 114 support the backrest 118 and seat pan 120 and help guide their respective motions. The frame assembly 110 can be constructed from rigid lightweight materials such as aluminum or carbon composites. Each of the backrest 118 and seat pan 120 constructions can include a rigid support member, cushion element applied atop the rigid support member, and dress over applied atop the cushion element. Additional elements can include adhesive layers and fire-blocking elements common in aircraft seating.

Each of the spaced vertical frame members 112, 114 includes an elongate linear guide track 122 for guiding reciprocating vertical translation of the backrest 118. As used herein, the term "reciprocating" means movement in a first direction for stowing and movement in a second direction for deploying, the two directions being along the same path but in opposite directions. The guide tracks 122 may be formed in or carried by the frame members 112, 114. As shown, each guide track 122 opens inward toward a respective side of the backrest 118. Guides 124 carried on the backrest 118 engage in and travel along the guide tracks 122 to guide the reciprocating vertical translation of the backrest. In some implementations, the backrest 118 carries an upper guide and a lower guide on each of the left and right sides of the backrest that travel along respective left and right guide tracks 122. In one non-limiting example, the guide tracks 122 are slide channels and the guides 124 are slides engaged to slide along the slide channels. In another non-limiting example, the guide tracks 122 are roller tracks and the guides 124 are rollers engaged to roll along the roller tracks. Other mechanisms for providing smooth translation of the backrest can be utilized.

Each guide track 122 has an upper end 126 and a lower end 128. The upper ends of the guide tracks 122 may or may not be reached at the upward limit of vertical translation of the backrest 118. As shown in FIG. 2, the lower ends 128 of the guide tracks 122 are reached and engaged and determine the lowest achievable vertical position of the backrest 118 relative to the spaced frame members 112, 114. This lowest vertical position corresponds to the fully deployed position of the CAS 100.

The seat pan 120 is mounted to the frame assembly 110 for pivoting motion. As shown, a horizontal pivot axis 130 extends through a bottom end of the frame assembly 110. In one non-limiting example, an elongate rod 132 can extend through a barrel formed through one end of the seat pan 120 providing the pivoting motion. In another non-limiting example, a hinge may rotatably couple the seat pan 120 to the frame assembly 110 to provides at least about 90 degrees of pivoting motion of the seat pan relative to the vertical plane of the frame assembly. Seat pan pivoting motion may be dampened in one or both directions using conventional mechanisms that are part of or separate from the hinge. Pivoting motion of the seat pan 120 may be about 90 degrees such that the seat pan pivots from vertical or near vertical in the fully stowed position to horizontal or near horizontal in the fully deployed position. When the seat is fully deployed, the seat pan 120 may be perpendicular to the backrest 118 or may be slightly inclined or declined.

At least one connecting link 134 connects the seat bottom 120 to the backrest. In some implementations, first and second like links 134 are symmetrically arranged on the left and right sides of the seat to maintain squareness of the assembly as the seat pan 120 pivots and the backrest 118 translates vertically. Each link 134 is elongate and linear and includes a first or upper end 136 pivotally attached to the backrest 118, and a second or lower end 138 pivotally attached to the seat pan 120. Each pivotal attachment may be through a revolute joint providing rotation about a horizontal pivot axis. Link attachment points to the respective seat pan 120 and backrest 118, and link length, are customizable to provide a desired amount of vertical translation of the backrest as the seat pan pivots between about 90 degrees between the stowed and deployed positions. As shown, for example, link attachment to each of the seat pan 120 and the backrest 118 is about equal distance inward from the facing ends such that the link comes to rest at about a 45 degree angle when the seat is fully deployed, and comes to rest at vertical when the seat is fully stowed (see FIG. 4).

The CAS 100 may further include a headrest 140 coupled to the top of the backrest 118. The headrest position may be fixed relative to the backrest 118 or the headrest may adjust vertically relative to the backrest using any number of conventional vertical adjustment mechanisms. As shown, the headrest 140 includes a padded support member mounted atop spaced parallel posts that extend into the backrest 118. The headrest 140 aligns in the same vertical plane with the backrest 118, frame assembly 110, and seat pan 120 in the stowed position to maintain a thin CAS profile.

Figure 3:
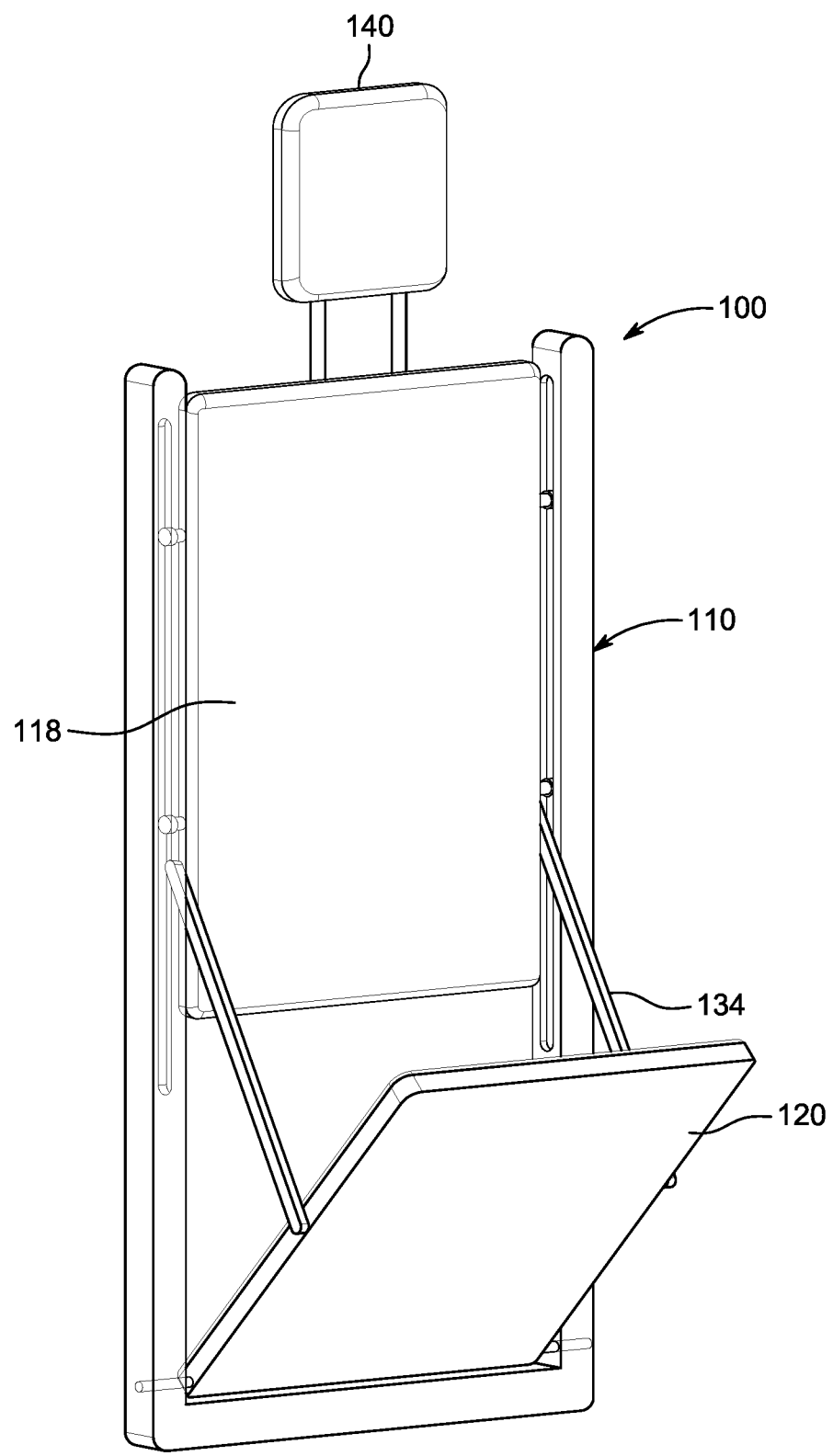
FIG. 3 is a perspective of the cabin attendant seat of FIG. 2 shown in an intermediate position.
Figure 4:
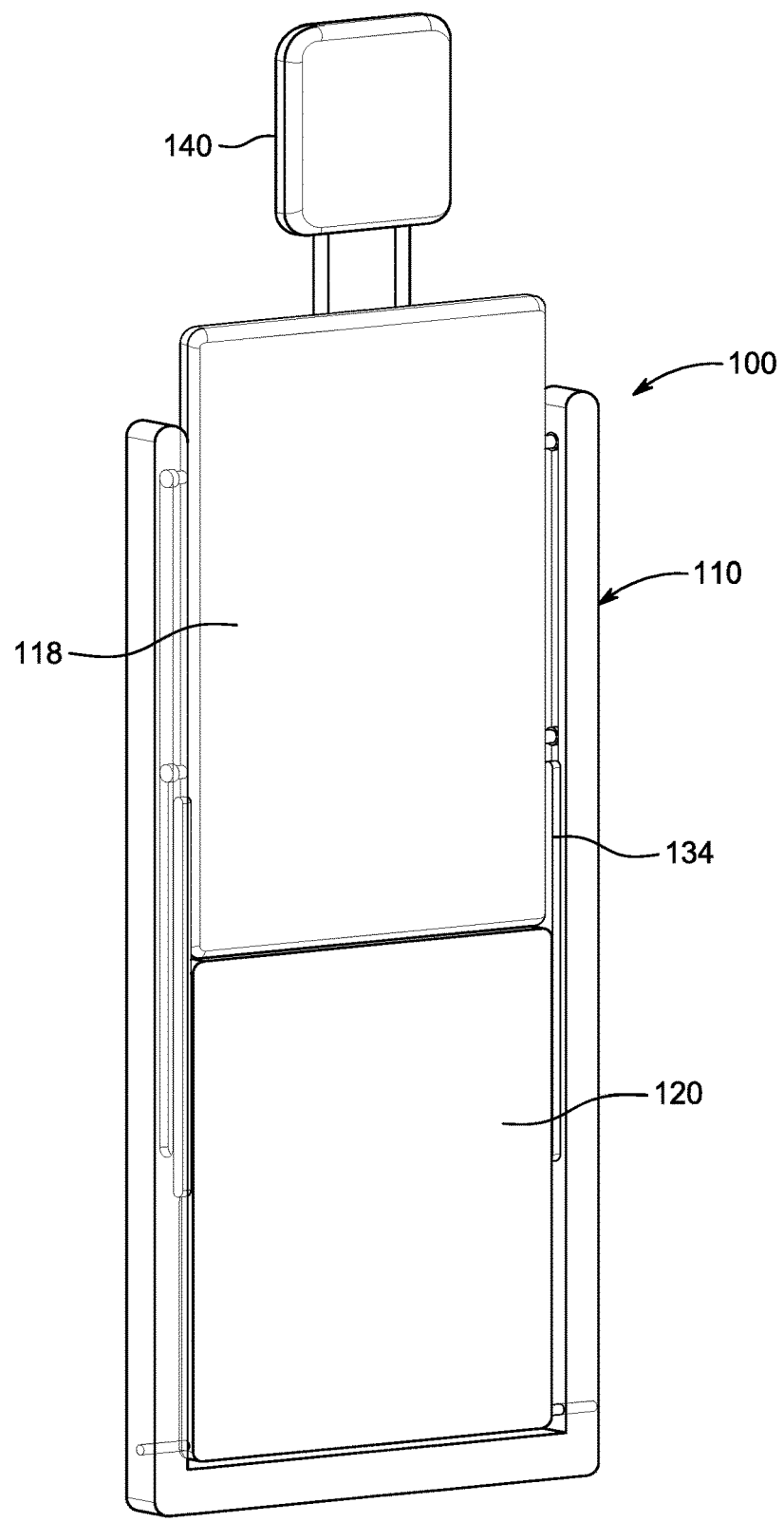
FIG. 4 is a perspective view of the cabin attendant seat of FIG. 2 shown in a stowed position.

FIGS. 2-4 show seat positions between fully deployed (FIG. 2) and fully stowed (FIG. 4) through at least one intermediate position (FIG. 3). In the fully deployed position, the backrest 118 comes to rest at its lowest vertical position and the seat pan 120 is at an angle to the backrest, for example, perpendicular to the backrest. The links 134 are at angle to each of the backrest 118 and the seat pan 120. To move the seat toward the deployed position, the user grabs and lowers the seat pan 120 causing the at least one link 134 to pull the backrest vertically down. The backrest 118 comes to rest seated at the lower ends 128 of the guide tracks 122. To move the seat toward the stowed position, the user grabs and lifts the forward end of the seat pan 120 causing the at least one link 134 to push the backrest 118 vertically up. In the fully stowed position, the backrest 118 raises to allow the seat pan 120 to pivot into the same vertical plane such that the backrest and seat pan stack vertically providing a thin profile. Seat motion may be manual or actuated.

Figure 5:
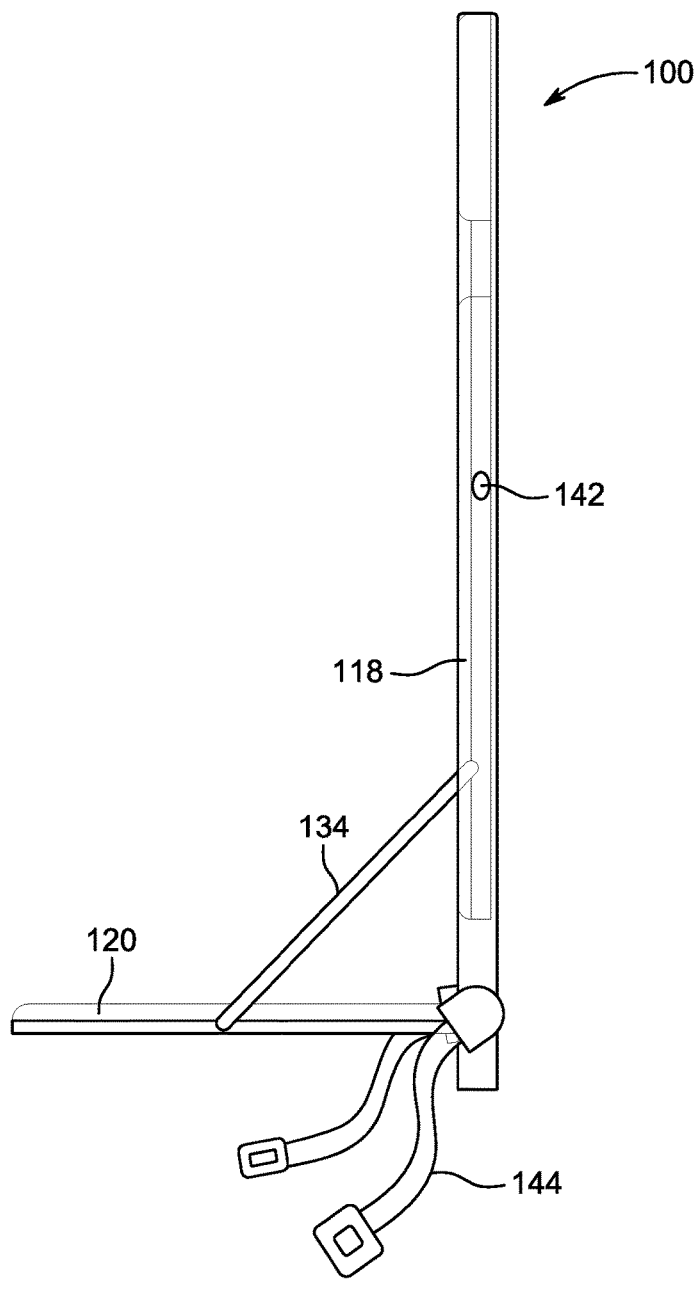
FIG. 5 is a side view showing the cabin attendant seat of FIG. 2 in a deployed position.

FIG. 5 shows the seat in the fully deployed position ready for use. A retainer 142, for example positioned within the recess or coupled to the frame assembly 110, may be provided for securing the seat in at least one of the fully stowed and fully deployed positions. In some implementations, the retainer 142 may be a plunger, catch, latch, locking pin or other mechanism adapted to engage at least one of the backrest 118, the seat pan 120, and the at least one link 134 to maintain the fully stowed position. In some implementations, a passenger restraint device 144 is provided for restraining the seat occupant against at least one of the seat pan 120 and the backrest 118. The passenger restraint device 144 may be a two-point lap belt, three-point lap and shoulder belt, or multi-point harness. Ends of the device 144 may anchor directly to the frame assembly.

Figure 6:
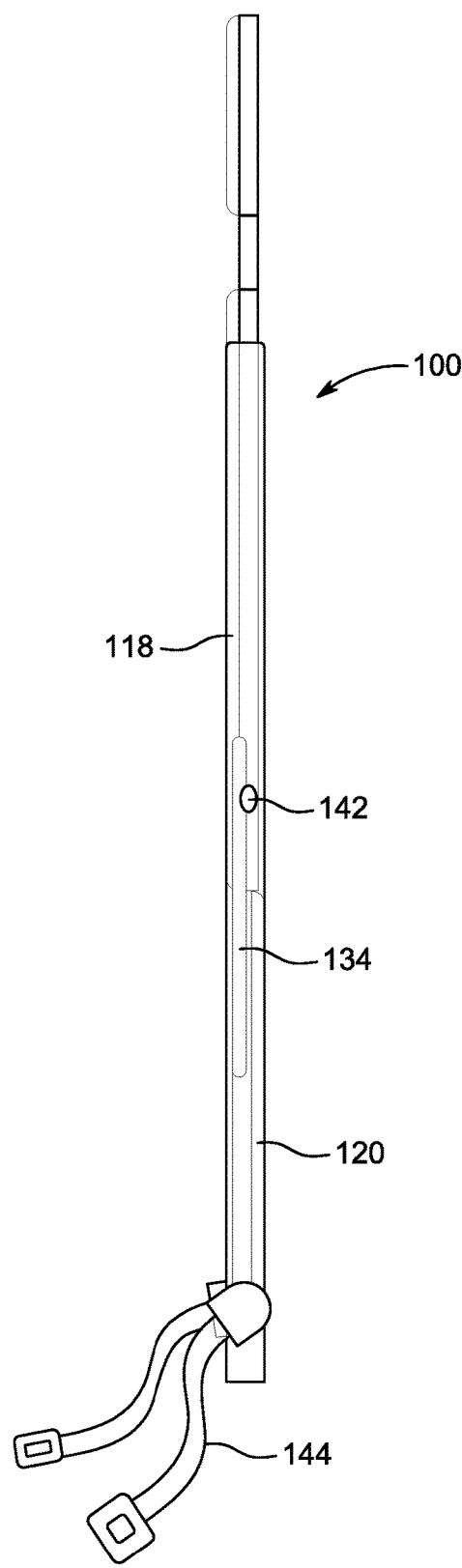
FIG. 6 is a side view showing the cabin attendant seat of FIG. 2 in a stowed position.

FIG. 6 shows the seat in the fully stowed position with the backrest 118 positioned above the seat pan 120 providing a thickness no greater than the thicker of the backrest or seat pan. The same or a second retainer may engage at least one of the backrest 118, the seat pan 120, and the at least one link 134 to maintain the stowed position.

In some implementations, the passenger restraint device 144 may stow within a storage area, for example, in a compartment within the wall recess when the seat is in the stowed position. Seat belts can include inertial reels and retractor assemblies also recessed into the CAS structure. Tensioners for shoulder belts may be configured such that a portion of the shoulder belt(s) is not fully retracted onto the inertial reels. Rather, un-retracted portions of the shoulder belts may cause the buckles of the shoulder belts to lay flat against backrest by gravity. In some implementations, a forward edge of the seat pan may include a handle recess to enable the user to move the seat between the stowed and deployed positions. For example, the handle recess may be a groove or cut-out in an edge or bottom of the seat pan.

In some implementations, the CAS when in the stowed position has a depth no more than about 10 cm, more preferably no more than about 8 cm, and most preferably no more than about 6 cm. The frame assembly may include, perimeter flange for securing to the wall. The frame assembly may be constructed or reinforced to withstand an applied 16G load to comply with FAA and EASA regulations set forth in 14 C.F.R. 25.562 and CS 25.562. In some examples, the wall may include embedded vertical and horizontal beams to which the frame assembly attaches. Vertical beams may be mounted to the cabin floor and ceiling or other aircraft structural component near the ceiling.

In some implementations, the seat pan hinge mechanism may bias the seat pan toward the stowed position. For example, a biasing member such as a piston or coil spring interconnected between the seat pan and the frame assembly may function to provide a lifting force on the seat pan such that the seat pan may lift from the deployed position to the stowed position as soon as the user leaves the seat.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A cabin attendant seat assembly, comprising:
   a frame assembly including spaced frame members disposed in a vertical plane;
   a backrest mounted between the spaced frame members and positioned in the vertical plane for reciprocating vertical translation between the spaced frame members;
   a seat pan mounted between the spaced frame members for pivoting motion, in and out of the vertical plane, relative to the frame assembly;

first and second links connecting the seat pan to the backrest, each of the first and second links pivotally attached at a first end to the backrest and pivotally attached at a second end to the seat pan such that upward pivoting motion of the seat pan moves the backrest vertically upward within the vertical plane and downward pivoting motion of the seat pan moves the backrest vertically downward within the vertically plane; and guide tracks formed in the spaced frame members and the backrest carrying guides that travel along the guide tracks, wherein the first end of each of the first and second links is pivotally attached to a respective one of the guides and the guides engage a lower end of the guide tracks to stop pivoting motion of the seat pan in a direction of a deployed position of the seat pan;

wherein:

in a stowed position of the cabin attendant seat assembly each of the spaced frame members, the backrest, the seat pan, and the first and second links reside in the vertical plane;

in the deployed position of the cabin attendant seat assembly the spaced frame members and the backrest reside in the vertical plane, the seat pan resides in a substantially horizontal plane, and the first and second links reside in a plane at an angle to each of the vertical plane and the substantially horizontal plane; and the seat pan is supported only by the first and second links and pivotal attachment to the spaced frame members.

2. The cabin attendant seat assembly according to claim 1, wherein the seat pan and the backrest move together between the stowed position in which the backrest and the seat pan are longitudinally aligned in the vertical plane with the backrest positioned vertically above the seat pan, and the deployed position in which the seat pan is at an angle to the backrest.

3. The cabin attendant seat assembly according to claim 1, wherein the guide tracks are slide channels and the guides are slides engaged to slide along the slide channels.

4. The cabin attendant seat assembly according to claim 1, wherein the guide tracks are roller tracks and the guides are rollers engaged to roll along the roller tracks.

5. The cabin attendant seat assembly according to claim 1, wherein the guide tracks have an upper end and the lower end, wherein the lower end determines a lowest vertical position of the backrest relative to the vertical frame members and a corresponding angle of the seat pan.

6. The cabin attendant seat assembly according to claim 1, wherein pivoting motion of the seat pan is at least 90 degrees relative to the vertical plane.

7. The cabin attendant seat assembly according to claim 1, comprising the first and second links symmetrically arranged on opposing sides of the seat pan and the backrest, wherein the first and second ends of the first and second links are coupled to the respective seat pan and the backrest through revolute joints.

8. The cabin attendant seat assembly according to claim 1, wherein the spaced frame members are oriented vertically and are interconnected by a horizontal frame member collectively forming a U-shaped frame assembly.

9. The cabin attendant seat assembly according to claim 1, further comprising a headrest coupled to a top of the backrest portion.

10. The cabin attendant seat assembly according to claim 1, wherein a thickness of the cabin attendant seat assembly when in the stowed position is no greater than a thickness of a thicker of the backrest and the seat pan.

11. The cabin attendant seat assembly according to claim 1, further comprising a retainer adapted to engage at least one of the seat pan and the backrest in the stowed position.

12. The cabin attendant seat assembly according to claim 1, further comprising a passenger restraint device anchored to the frame assembly proximate the pivotal attachment location of the seat pan to the spaced frame members, the passenger restraint device for restraining a seated passenger against at least one of the seat pan and the backrest.

13. An assembly adapted to be installed in an aircraft cabin, comprising:

a wall having a recess defining a vertical plane; and a cabin attendant seat assembly mounted in the recess, comprising:

a frame assembly including spaced frame members disposed in the vertical plane;

a backrest mounted between the spaced frame members and positioned in the vertical plane for reciprocating vertical translation between the spaced frame members;

a seat pan mounted between the spaced frame members for pivoting motion, in and out of the vertical plane, relative to the frame assembly;

first and second links connecting the seat pan to the backrest, each of the first and second links pivotally attached at a first end to the backrest and pivotally attached at a second end to the seat pan such that upward pivoting motion of the seat pan moves the backrest vertically upward within the vertical plane and downward pivoting motion of the seat pan moves the backrest vertically downward within the vertically plane; and guide tracks formed in the spaced frame members and the backrest carrying guides that travel along the guide tracks, wherein the first end of each of the first and second links is pivotally attached to a respective one of the guides and the guides engage a lower end of the guide tracks to stop pivoting motion of the seat pan in a direction of a deployed position of the seat pan;

wherein:

in a stowed position of the cabin attendant seat assembly each of the spaced frame members, the backrest, the seat pan, and the first and second links reside in the vertical plane;

in the deployed position of the cabin attendant seat assembly the spaced frame members and the backrest reside in the vertical plane, the seat pan resides in a substantially horizontal plane, and the first and second links reside in a plane at an angle to each of the vertical plane and the substantially horizontal plane; and the seat pan is supported only by the first and second links and pivotal attachment to the spaced frame members.

14. The assembly according to claim 13, wherein the seat pan and the backrest move together between the stowed position in which the backrest and the seat pan are longitudinally aligned in the vertical plane with the backrest positioned vertically above the seat pan, and the deployed position in which the seat pan is at an angle to the backrest.

15. The assembly according to claim 13, wherein the wall is part of a galley, a lavatory, a partition, a divider, a door, or a monument, and wherein the recess is formed in an exterior face of the wall.

16. The assembly according to claim 13, comprising the first and second links symmetrically arranged on opposing sides of the seat pan and the backrest, wherein each of the first and second ends of the first and second links are connected to the respective seat pan and the backrest through revolute joints.

17. The assembly according to claim 13, wherein the cabin attendant seat assembly further comprises:
   a headrest coupled to a top of the backrest;
   a retainer for engaging at least one of the seat pan and the backrest in the stowed position; and
   a passenger restraint device anchored to the frame assembly proximate the pivotal attachment location of the seat pan to the spaced frame members, the passenger restraint device for restraining a seated passenger against at least one of the seat pan and the backrest.

18. The assembly according to claim 13, wherein a depth of the recess is equal to a thickness of a thicker of the seat pan and the backrest, and wherein the seat pan and the backrest align flush with a face of the wall when in the stowed position.

\* \* \* \* \*